United States Patent [19]

Yamaura

[11] Patent Number: 4,577,254
[45] Date of Patent: Mar. 18, 1986

[54] PROTECTIVE RELAY SYSTEM

[75] Inventor: Mitsuru Yamaura, Hachioji, Japan

[73] Assignee: Kabushiki Kaisha Toshiba, Kawasaki, Japan

[21] Appl. No.: 637,722

[22] Filed: Aug. 6, 1984

[30] Foreign Application Priority Data

Aug. 10, 1983 [JP] Japan ................. 58-144988

[51] Int. Cl.$^4$ ............................. H02H 3/28
[52] U.S. Cl. ................... 361/80; 364/482; 364/492
[58] Field of Search ............... 361/79–81; 364/482, 483, 492

[56] References Cited

U.S. PATENT DOCUMENTS

| | | | |
|---|---|---|---|
| 4,107,778 | 8/1978 | Nii et al. | 361/80 X |
| 4,300,182 | 11/1981 | Schweitzer | 361/79 |
| 4,333,151 | 6/1982 | Matsushima | 361/80 X |
| 4,344,143 | 8/1982 | Kurosawa et al. | 361/80 X |

FOREIGN PATENT DOCUMENTS 53-31747 9/1978 Japan.

OTHER PUBLICATIONS

W. D. Breingan et al., "The Laboratory . . . Lines", Prosecuted at IEEE IEEE PES Meeting, Jan.-Feb. 1977.

Primary Examiner—Harry E. Moose, Jr.
Attorney, Agent, or Firm—Schwartz, Jeffery, Schwaab, Mack, Blumenthal & Evans

[57] ABSTRACT

In a machine implemented method and a system for protecting an electric power system, a differential equation $$v = L(di/dt) + Ri$$

is solved by using an approximation $$\left(\frac{di}{dt}\right) t = t_k + \left(\frac{di}{dt}\right) t = t_{k-1} \approx \sum_{p=0}^{N} K_p(i_{k+p} - i_{k-p-1}) \quad (3)$$

to determine the inductance L and to measure or discriminate the distance from the determined inductance, where
v represents the voltage,
i represents the current,
R represents the resistance,
t represents the time,
$t_k$ and $t_{k-1}$ represent time points,
$i_{k+p}$ and $i_{k-p-1}$ represent values of the current i for time points represented by $t_{k+p}$ and $t_{k-p-1}$,
p represents integers (0, 1, . . . N),
N represents a natural number,
$K_p$ (p=0, 1, . . . N) represents constants, with at least $K_0$ and $K_1$ being values other than zero and being so determined that the errors in the approximation for the inductance is zero for specified frequencies.

12 Claims, 4 Drawing Figures

PROTECTIVE RELAY SYSTEM

BACKGROUND OF THE INVENTION

The present invention relates to a protective relay system of a distance measurement type.

Protective relay systems of a distance measurement type are classified into those determining the distance in accordance with an impedance in a steady state and those utilizing a differential equation which holds even in a transient state. The protective relay systems of the former class have been widely adopted for a long time because stable characteristics are obtained. But they have encountered a problem in recent years when distortions in the voltage and current are greater, and filters have to be inserted to remove the distortions and this in turn causes a delay in the response due to delay in the output of the filter. For this reason, the protective relay systems of the latter class are now drawing attentions. Examples of the protective relay system belonging to this class are shown in the following publications:

(i) Japanese Patent Application Publication No. 31747/1978, "A system for measuring an impedance component in an electric power system".

(ii) IEEE Paper F77 052-4, W. D. Breingan et al, "The Laboratory Investigation of a Digital System for the Protection of Transmission Lines".

These systems both determine the inductance L of an electric power system, e.g., a transmission line, by solving a differential equation $$v = L(di/dt) + Ri \qquad (1)$$

where v, i and R respectively represent the voltage, the current and the resistance of the transmission line, by utilizing an approximate expression:

$$(di/dt) \approx (i_1 - i_0)/(t_1 - t_0) \qquad (2)$$

where $i_0$ and $i_1$ represent the values of the current i at different time points $t_0$ and $t_1$ (having one sampling interval between them).

The approximation by the equation (2) has a sufficiently high accuracy as far as the variation in the current i is slow compared with the difference $t_1 - t_0$, i.e., one sampling interval. In other words, a sufficient accuracy is ensured for the fundamental frequency component but the error for the second harmonic or the like is considerable. It is necessary to improve the frequency characteristics in order to attain a sufficiently high accuracy over a wide frequency range without removing the frequency components of these regions by the use of a filter.

SUMMARY OF THE INVENTION

An object of the invention is to improve distance measurement, and particularly its frequency characteristic of a protective relay system.

According to the invention, there is provided a method and a system for electric power system protection, wherein a differential equation $$v = L(di/dt) + Ri$$

is solved by using an approximation $$\left(\frac{di}{dt}\right) t = t_k + \left(\frac{di}{dt}\right) t = t_{k-1} \approx \sum_{p=0}^{N} K_p(i_{k+p} - i_{k-p-1}) \qquad (3)$$

to determine the inductance L and to measure or discriminate the distance from the determined inductance, where v represents the voltage,
i represents the current,
R represents the resistance,
t represents the time,
$t_k$ and $t_{k-1}$ represent time points,
$i_{k+p}$ and $i_{k-p-1}$ represent values of the current i for time points represented by $t_{k+p}$ and $t_{k-p-1}$,
p represents integers (0, 1, ... N),
N represents a natural number,
$K_p$ (p=0, 1, ... N) represents constants, with at least $K_0$ and $K_1$ being values other than zero and being so determined that the errors in the approximation for the inductance is zero for specified frequencies.

DETAILED DESCRIPTION OF THE PREFERRED EMBODIMENTS

Figure 1:
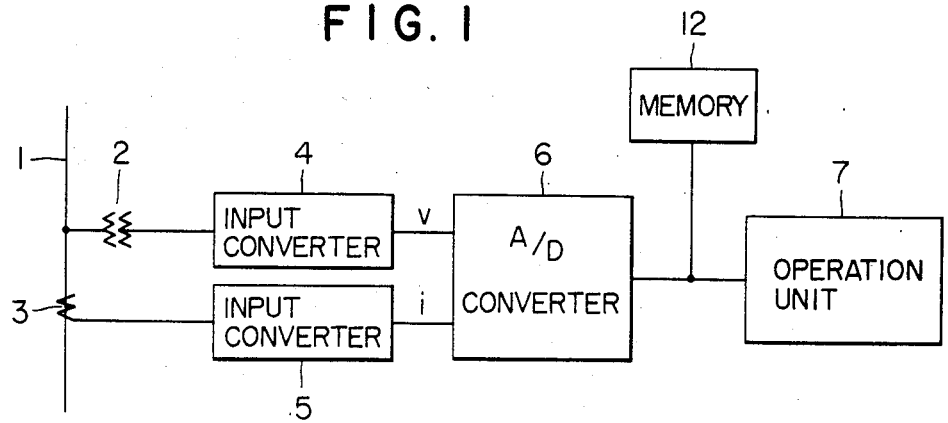
FIG. 1 is a block diagram showing hardware of a protective relay system of an embodiment of the invention.

Referring now more particularly to FIG. 1, there is shown a hardware structure of the protective relay system in connection with a transmission line 1, forming an example of electric power system to be protected by the protective relay system. The protective relay system comprises a voltage transformer 2 and a current transformer 3 respectively detecting the voltage and the current of the transmission line, which is, in the case under consideration, assumed to be a single-phase line for the purpose of simplicity of explanation. An input converting circuit 4 receives the output of the transformer 2 and converts it into a signal of a suitable level, and comprises a pre-filter for removing high frequency components. The output v of the pre-filter constitutes the output of the input converting circuit 4. The input converting circuit 4 having such functions can be constructed in a known manner, so that details thereof will not be described here. An input converting circuit 5 is similar to the input converting circuit 4. It receives the secondary current of the current transformer 3 and converts it into a voltage signal of a suitable level, and comprises a pre-filter for removing high frequency components. The output i of the pre-filter constitutes the output of the input converting circuit 5. The reference characters v and i are also used to denote the voltage and the current of the transmission line 1.

An AD converting circuit 6 simultaneously samples the output v of the input converting circuit 4 and the output i of the input converting circuit 5 at regular intervals and digitizes the sampled values to provide digital signals indicative of the instantaneous values of the voltage v and the current i. The AD converting circuit 6 having such functions can be constructed in a known manner, so that the details thereof will not be described here. The digital signals or data from the AD converting circuit are stored in a data memory 12. Thus the data stored in the memory 12 form time series of data indicative of the instantaneous values $v_k$, $i_k$ of the voltage and the current, with k representing the sampling time points as expressed by the consecutive integers.

An operation unit 7 may for example be formed of a computer, such as a microcomputer, and performs arithmetic operations, judgements, and input/output operations normally required of a protective relay system, but such functions are realized in a known manner utilizing known techniques, so that details thereof will not be described here. The operation unit 7 also performs the following arithmetic operation to determine the inductance L of that portion of the electric power system which lies between the relay location and the fault point.

$$L = \frac{(i_m + i_{m-1})(v_n + v_{n-1}) - (i_n + i_{n-1})(v_m + v_{m-1})}{(i_m + i_{m-1})\sum_{p=0}^{N} K_p(i_{n+p} - i_{n-p-1}) - (i_n + i_{n-1})\sum_{p=0}^{N} K_p(i_{m+p} - i_{m-p-1})} \quad (4)$$

where $v_k$ (k=n, n−1, m or m−1) and $i_k$ (k=n, n−1, m, m−1, n+p, n−p−1, m+p, or m−p−1) represent the values of the voltage and the current at the respective time points k, n and m represent sampling time points as expressed by respective one of consecutive integers, with n and m differing from each other, p represents integers 0, 1, ... N N represents a predetermined natural number $K_p$ (p=0, 1, ... N) represents a constant, with at least $K_0$ and $K_1$ being values other than zero and being so determined, in a manner described later, that the errors in the approximation for the inductance is zero for specified or selected frequencies.

The operation unit 7 also performs judgment in accordance with the value of L determined according to the above equation.

Figure 2:
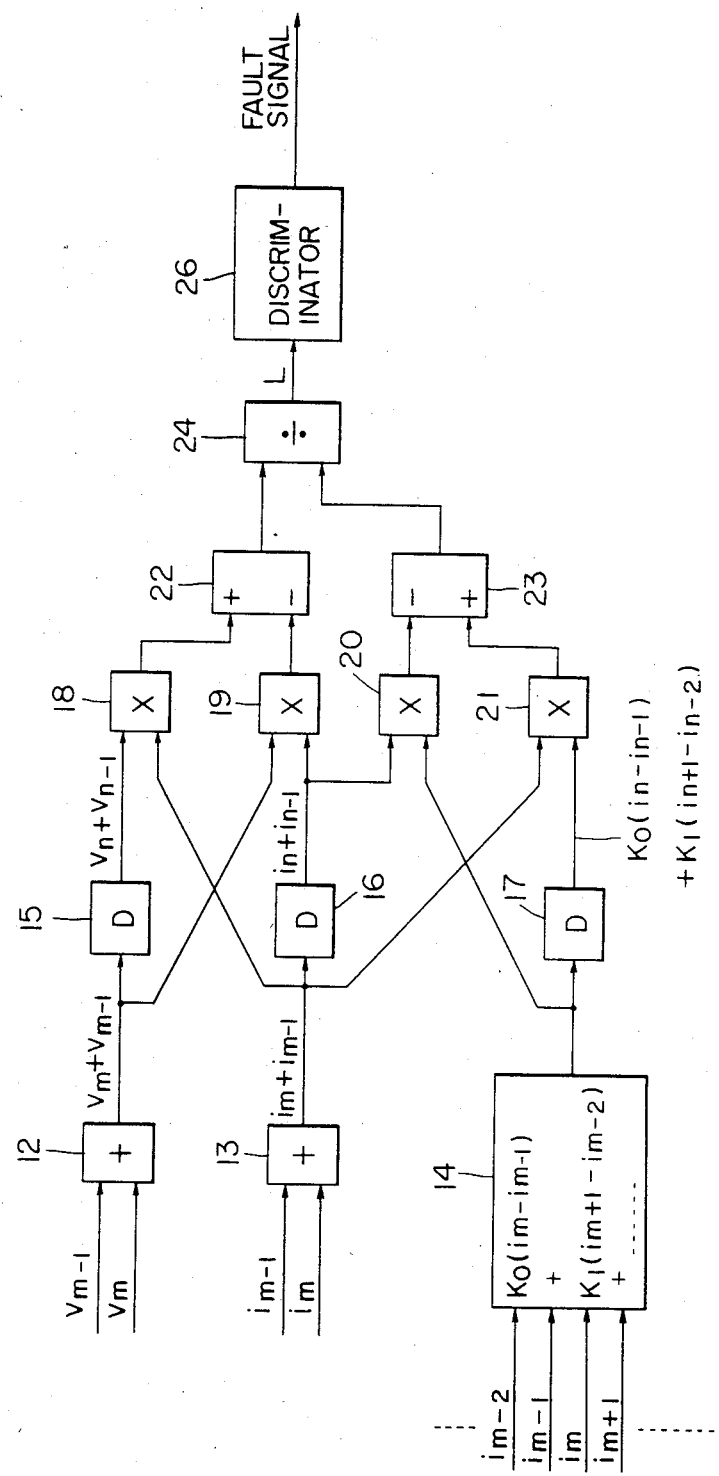
FIG. 2 is a block diagram showing functions of the operation unit of the system of FIG. 1.

FIG. 2 is a block diagram illustrating the functions of the operation circuit 7 of performing the abovementioned operations.

Adding means 12 and 13 receive the samples $v_{m-1}$, $v_m$ and $i_{m-1}$, $i_m$ and produce outputs $v_m + v_{m-1}$ and $i_m + i_{m-1}$.

A differentiating means 14 receives the samples $i_{m+p}$, $i_{m-p-1}$ (p=0, 1, ... N), namely, ..., $i_{m-2}$, $i_{m-1}$, $i_m$, $i_{m+1}$, ... and produces an output expressed by:

$$K_0(i_m - i_{m-1}) + K_1(i_{m+1} - i_{m-2}) + \ldots = \sum_{p=0}^{N} K_p(i_{m+p} - i_{m-p-1})$$

The outputs of the adding means 12, 13 and the differentiating means 14 are passed through respective delay means 15, 16 and 17 having a delay time (n-m) to result in:

$v_n + v_{n-1}$, $i_n + i_{n-1}$, and $$K_0(i_n - i_{n-1}) + K_1(i_{n+1} - i_{n-2}) + \ldots = \sum_{p=0}^{N} K_p(i_{n+p} - i_{n-p-1})$$

A multiplying unit 18 receives and multiplies $v_n + v_{n-1}$ and $i_m + i_{m-1}$ and produces an output expressed by the first term of the numerator of the equation (4). A multiplying unit 19 receives and multiplies $v_m + v_{m-1}$ and $i_n + i_{n-1}$ and produces an output expressed by the second term of the numerator of the equation (4). A multiplying unit 20 receives and multiplies $i_n + i_{n-1}$ and $$\sum_{p=0}^{N} K_p(i_{m+p} - i_{m-p-1})$$

and produces an output expressed by the second term of the denominator of the equation (4). A multiplying unit 21 receives and multiplies $i_m + i_{m-1}$ and $$\sum_{p=0}^{N} K_p(i_{n+p} - i_{n-p-1})$$

A subtracting unit 22 subtracts the output of the unit 19 from the output 18 to determine a value expressed by the numerator of the equation (4). A subtracting unit 23 subtracts the output of the unit 20 from the output 21 to determine a value expressed by the denominator of the equation (4). A dividing unit 24 divides the output of the unit 22 by the output of the unit 23 to determine the value expressed by the entirety of the equation (4), i.e., the inductance L.

The signal indicative of the inductance L thus determined is applied to a discriminator 26 which produces a fault signal if the inductance L is found to be within a specified range. The fault signal is used for producing an alarm, or for tripping a circuit breaker, not shown, provided at the relay location to protect the transmission line, or is used in combination with a signal produced as a result of protective relay operation of different type.

In the example described with reference to FIG. 2, the data indicative of the values $v_m$, $v_{m-1}$, $i_m$, $i_{m-1}$, $i_{m-p-1}$ and $i_{m+p}$ are derived from the data memory 12, while the data indicative of the values $v_n$, $v_{n-1}$, $i_n$, $i_{n-1}$, $i_{n-p-1}$ and $i_{n+p}$ are produced by the use of delay means within the operation unit 7 from the data supplied from the memory 12.

However, the arrangement may alternatively be such that the data indicative of the values $v_n$, $v_{n-1}$, $i_{n-1}$, $i_{n-p-1}$ and $i_{n+p}$ are also supplied from the memory 12.

Now explanation as to why the incorporation of the approximate expression (3) in the equation (1) leads to the equation (4), and why the use of the approximate expression (3) ensures a high accuracy will be given. From the equation (1), we obtain, $$v_m = Li'_m + Ri_m, v_{m-1} = Li'_{m-1} + Ri_{m-1} \quad (5)$$

where $i'_m$ denotes $(di/dt)_{t=tm}$ (similar notations will be used in the specification)

$$\therefore v_m + v_{m-1} = L(i'_m + i'_{m-1}) + R(i_m + i_{m-1}) \quad (6)$$

Similarly, $$v_n + v_{n-1} = L(i'_n + i'_{n-1}) + R(i_n + i_{n-1}) \quad (7)$$

Using the approximation (3) for k=m and k=n, $$i'_m + i'_{m-1} \doteq \sum_{p=0}^{N} K_p(i_{m+p} - i_{m-p-1}) \quad (8)$$

$$i'_n + i'_{n-1} \doteq \sum_{p=0}^{N} K_p(i_{n+p} - i_{n-p-1}) \quad (9)$$

If we substitute the equations (8) and (9) in the equations (6) and (7), we will obtain the equation (4).

Figure 3:
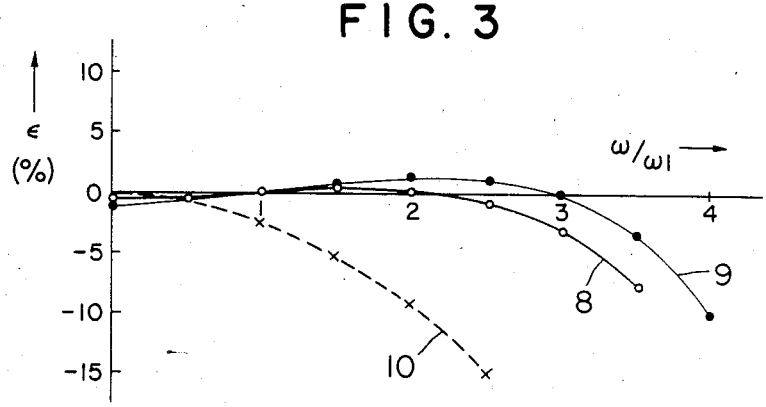
FIG. 3 is a characteristic diagram for comparing the conventional system and the system of the invention.

FIG. 3 shows the performance or the accuracy of the system of the invention and a conventional system. The solid lines 8 and 9 illustrate two examples of error versus frequency characteristics of inductance measurement according to the invention, while the broken line 10 illustrates an example of error versus frequency characteristics of inductance measurement of a conventional system. It will be seen that the system according to the invention has much smaller errors over a wide range of frequency than the conventional system. This means that the system of the invention is less affected by waveform distortion. This will be explained next.

The true value $L_t$ of the inductance, which is obtained by solving the equations (6) and (7) without using the approximation of the expressions (8) and (9), is given by:

$$L_t = \frac{(i_m + i_{m-1})(v_n + v_{n-1}) - (i_n + i_{n-1})(v_m + v_{m-1})}{(i_m + i_{m-1})(i'_n + i'_{n-1}) - (i_n + i_{n-1})(i'_m + i'_{m-1})} \quad (10)$$

From the equations (4) and (10), the error ratio $\epsilon$ is given by:

$$\epsilon = \frac{L}{L_t} - 1 \quad (11)$$

$$= \frac{(i_m + i_{m-1})(i'_n + i'_{n-1}) - (i_n + i_{n-1})(i'_m + i'_{m-1})}{(i_m + i_{m-1})\sum_{p=0}^{N} K_p(i_{n+p} - i_{n-p-1}) - (i_n + i_{n-1})\sum_{p=0}^{N} K_p(i_{m+p} - i_{m-p-1})} - 1$$

To examine the frequency characteristic of the error ratio $\epsilon$, the angular frequency and the phase are denoted by $\omega$ and $\theta$, respectively, and if $$i_k = I \sin(\omega t_k + \theta) = I \sin \phi_k, \; \phi_k = \omega t_k + \theta \quad (12)$$

then, $$i_{k-1} = I\sin(\omega t_{k-1} + \theta) = I\sin(\phi_k - \Psi), \; \Psi = \omega T, \; T = t_k - t_{k-1} \quad (13)$$

$$i'_k = \omega I \cos\phi_k, \; i'_{k-1} = \omega I\cos(\phi_k - \Psi) \quad (14)$$

$$i_k + i_{k-1} = I\sin\phi_k + I\sin(\phi_k - \Psi) \quad (15)$$
$$= 2I\sin(\phi_k - \Psi/2)\cos\Psi/2$$

$$i'_k + i'_{k-1} = \omega I\cos\phi_k + \omega I\cos(\phi_k - \Psi) \quad (16)$$
$$= 2\omega I\cos(\phi_k - \Psi/2)\cos\Psi/2$$

-continued
$$i_{k+p} - i_{k-p-1} = I\sin(\phi_k + p\Psi) - I\sin\{\phi_k - (p+1)\Psi\} \quad (17)$$
$$= 2I\cos(\phi_k - \Psi/2)\sin(p + \tfrac{1}{2})\Psi$$

Utilizing these, the equation (11) can be rewritten as:

$$\epsilon = \frac{\omega\cos\Psi/2}{\sum_{p=0}^{N} K_p\sin(p + \tfrac{1}{2})\Psi} - 1 = \quad (18)$$

$$\frac{\omega\cos\omega T/2}{\sum_{p=0}^{N} K_p\sin(p + \tfrac{1}{2})\omega T} - 1$$

As was stated earlier, $K_0$ and $K_1$ are not zero and can be selected to have such values to result in $\epsilon = 0$ at specified or selected angular frequencies of $\omega = \omega_1$ and $\omega = \omega_2$ in the equation (18).

This is accomplished by solving simultaneous equations derived from the equation (18) by putting $\epsilon = 0$ and substituting the specific values $\omega_1$, $\omega_2$ for $\omega$. As an example, a set of two simultaneous equations derived when only $K_0$, $K_1$ are not zero, and $K_2$, $K_3$, $K_4$, etc are zero are shown below:

$$0 = \frac{\omega_1\cos\omega_1 T/2}{K_0\sin\tfrac{1}{2}\omega_1 T + K_1\sin(1 + \tfrac{1}{2})\omega_1 T} - 1$$

$$0 = \frac{\omega_2\cos\omega_2 T/2}{K_0\sin\tfrac{1}{2}\omega_2 T + K_1\sin(1 + \tfrac{1}{2})\omega_2 T} - 1$$

The solid line 8 in FIG. 3 represents an example where $\omega_1 T = 30°$, $\omega_2/\omega_1 = 2$, while the solid line 9 represents an example where $\omega_1 T = 30°$, $\omega_2/\omega_1 = 3$. If $\omega_1$ is the fundamental angular frequency, $\epsilon$ is zero at the fundamental frequency and at a frequency twice the fundamental frequency with the former example, while $\epsilon$ is zero at the fundamental frequency and at a frequency three times the fundamental frequency with the latter example. In each case, the error ratio is very small in the area proximate to the frequency where $\epsilon = 0$.

In contrast, the conventional system uses the approximation of the equation (2) so that the error ratio is 0 at $\omega = 0$ and the error ratio $\epsilon$ increases with the angular frequency $\omega$. The broken line 10 in FIG. 3 represents an example where $\omega_1 T = 30°$.

It has been assumed that $K_0$ and $K_1$ are other than zero and $K_2$, $K_3$, $K_4$, etc., are zero. But if $K_2$, $K_3$, $K_4$, etc. are also set to be a value, to make $\epsilon = 0$ at respective frequencies, the frequency characteristic is further improved. However, with a larger number of $K_p$ which are not zero, it takes a longer time for calculation and delay in response becomes longer. Accordingly, a compromise must be made between a higher accuracy and a quick response. It has however been found that usuing two non-zero constants $K_0$, $K_1$ to obtain $\epsilon = 0$ at two frequencies yields practically satisfactory results.

In describing the embodiment of FIG. 1, the transmission line 1 is assumed to be a single-phase transmission. This is to facilitate explanation and understanding of the invention. But the invention is also applicable to protection of a multiple-phase e.g., three-phase, transmission line. For instance, two-phase fault in a three-phase transmission line can be dealt with in a manner similar to that adopted with the single-phase transmission line if one uses the line voltage and the delta current, as will be understood from a well known theory.

Figure 4:
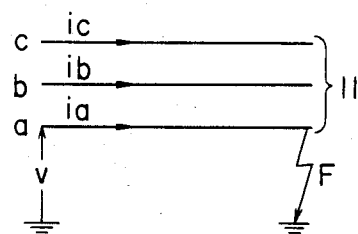
FIG. 4 is a diagram showing another example of the transmission line for which the protective relay system according to the invention can be used.

FIG. 4 shows a three-phase transmission line which can be protected by a protective relay system of another embodiment of the invention. As is seen, a three-phase transmission line including lines of phases a, b and c is shown to have a single-line grounding fault F in the phase a. If the voltage at the location where the protective relay system is provided is denoted by v, and the currents of the respective phases a, b and c are denoted by $i_a$, $i_b$ and $i_c$, the following equation, which itself is well known, holds:

$$v = r_a i_a + L_a i'_a + r_{ab} i_b + L_{ab} i'_b + r_{ac} i_c + L_{ac} i'_c \quad (19)$$

$$= r_a i + L_a j$$

where $$i = i_a + \frac{r_{ab}}{r_a} i_b + \frac{r_{ac}}{r_a} i_c, \quad (20)$$

$$j = i_a + \frac{L_{ab}}{L_a} i_b + \frac{L_{ac}}{L_a} i_c \quad (20)$$

where $r_a$ represents a resistive component of the self-impedance, $r_{ab}$ and $r_{ac}$ represent resistive components of the mutual-impedance, $L_a$ represents an inductive component of the self-impedance, $L_{ab}$ and $L_{ac}$ represent inductive components of the mutual-impedance, $i'_a$, $i'_b$, $i'_c$ and $j'$ denote time differentials of $i_a$, $i_b$, $i_c$ and $j$, respectively, as described earlier in this specification.

The equation (19) can be solved in a similar manner as with the equation (4) as to $L_a$ and the following equation is derived.

$$L_a = \frac{(i_m + i_{m-1})(v_n + v_{n-1}) - (i_n + i_{n-1})(v_m + v_{m-1})}{(i_m + i_{m-1})\sum_{p=0}^{N} K_p (j_{n+p} - j_{n-p-1}) - (i_n + i_{n-1})\sum_{p=0}^{N} K_p (j_{m+p} - j_{m-p-1})} \quad (21)$$

Here, the suffixes m, n and p and the constant N and $K_p$ are similar to those of the same reference characters in the equation (4). The equation (21) is identical to the equation (4) except that the currents $i_a$, $i_b$, $i_c$ and synthetic values i an j are used. Conversely speaking, we may regard the equation (21) as a more generalized form, and the equation (4) as a specific form where the synthetic values i and j of the equation (21) are (or happen to be) i.

The invention is applicable not only to a situation where, as has been described, the value of the inductance L or $L_a$ is first determined and then judgment is made as to whether the determined inductance is within a specified range, but also to a situation where judgment is made whether the inductance is larger or smaller than a predetermined value. Therefore, instead of first determining the inductance L according to the equation (4) and then judging whether or not $$L \leq L_s \quad (22)$$

one may use the following expression.

$$[(i_m + i_{m-1})(v_n + v_{n-1}) - (i_n + i_{n-1})(v_m + v_{m-1})] - \quad (23)$$

$$L_s[(i_m + i_{m-1})\sum_{p=0}^{N} K_p(i_{n+p} - i_{n-p-1}) -$$

$$(i_n + i_{n-1})\sum_{p=0}^{N} K_p(i_{m+p} - i_{m-p-1})] \leq 0$$

to make judgment directly. This is a commonly adopted technique. Still alternatively, the right side of the expression (23) may be a very small positive value, rather than zero, to increase the stability of operation of the relay device. This itself is also a well known technique.

It should therefore be understood that the invention embraces any method or system in which the inductance is measured or discriminated according to the concept expressed by the equations described or any equivalent equations.

Instead of having a fault signal produced solely in accordance with the result of the determination of the inductance, the determined value of the inductance may be in combination with other value or values to calculate some other quantity, and a signal to be used for protection is produced in accordance with the resultant value of such other quantity.

The signal to be used for protection may not necessarily be a fault signal for producing an alarm or for tripping a circuit breaker, but may be a signal used in combination with a signal produced as a result of protective relay operation or function of a different type.

The principle of the invention described with reference to the expressions (19), (20), (21), with which it was assumed that the synthetic values are of different types of electric quantities, e.g., the currents of the different phases $i_a$, $i_b$, $i_c$, is also applicable to a situation where the synthetic values are of the same type of electric quantities. For instance, if synthetic values $u_k$ and $w_k$ are defined as:

$$\left. \begin{array}{l} u_k = v_k + v_{k-H} \\ w_k = i_k + i_{k-H} \end{array} \right\} \quad (24)$$

(where H represents a constant), u and w may be used in place of v and i in the equation (4), and the equation (4) still holds. This will be clear in view of the process of deriving the equation (4) from the equations (5), (6), (7), (8), etc. The equations (24) represent a well known digital filtering technique, and systems having such a well known technique incorporated therein should be construed to be within the scope of the invention.

As has been described, according to the invention, a greater number of sample values are used for the approximation of differentials, and thereby the frequency characteristics of the distance measurement is improved.

What is claimed is:

1. A machine implemented method for protecting an electric power system comprising the steps of:

providing signals indicative of instantaneous values of sampled electrical quantities or their synthetic values, determining or discriminating the distance in accordance with the equation:

$$L_a = \frac{(i_m + i_{m-1})(v_n + v_{n-1}) - (i_n + i_{n-1})(v_m + v_{m-1})}{(i_m + i_{m-1})\sum_{p=0}^{N} K_p(j_{n+p} - j_{n-p-1}) - (i_n + i_{n-1})\sum_{p=0}^{N} K_p(j_{m+p} - j_{m-p-1})} \quad (21)$$

where

L represents the inductance of that portion of the electric power system which lies between the relay location and the fault point, $v_k$ (k=n, n−1, m, or m−1), $i_k$ (k=n, n−1, m, or m−1), and $j_k$ (k=n+p, n−p−1, m+p, or m−p−1) represent said instantaneous values or said synthetic values for the time point k, n and m represent sampling time points as expressed by consecutive integers, with n and m differing from each other, p represents integers 0, 1, . . . N, N represents a predetermined natural number, $K_p$ (p=0, 1, . . . N) represents constants, with at least $K_0$ and $K_1$ being values other than zero and being so determined that the errors in the approximation for the inductance is zero for specificed frequencies, and producing a signal to be used for the protection of the electric power system according to the result of the determination or the discrimination.

2. A method according to claim 1, wherein the constants $K_p$ are determined by solving a set of simultaneous equations derived by substituting the specified values $\omega_q$ (q=1, 2, . . . N+1) for $\omega$ in the equation $$0 = \frac{\omega\cos\omega T/2}{\sum_{p=0}^{N} K_p\sin(p + \frac{1}{2})\omega T} - 1$$

3. A method according to claim 1, wherein N=1.

4. A method according to claim 1, wherein the difference between n and m is 1.

5. A protective relay system for an electric power system comprising:

means for providing signals indicative of instantaneous values of sampled electrical quantities or their synthetic values, means for determining or discriminating the distance in accordance with the equation:

$$L_a = \frac{(i_m + i_{m-1})(v_n + v_{n-1}) - (i_n + i_{n-1})(v_m + v_{m-1})}{(i_m + i_{m-1})\sum_{p=0}^{N} K_p(j_{n+p} - j_{n-p-1}) - (i_n + i_{n-1})\sum_{p=0}^{N} K_p(j_{m+p} - j_{m-p-1})} \quad (21)$$

where

L represents the inductance of that portion of the electric power system which lies between the relay location and the fault point, $v_k$ (k=n, n−1, m, or m−1), $i_k$ (k=n, n−1, m, or m−1), and $j_k$ (k=n+p, n−p−1, m+p, or m−p−1) represent said instantaneous values or said synthetic values for the time point k, n and m represent sampling time points as expressed by consecutive integers, with n and m differing from each other, p represents integers 0, 1, . . . N, N represents a predetermined natural number, $K_p$ (p=0, 1, . . . N) represents contants, and with at least $K_0$ and $K_1$ being values other than zero and being so determined that the errors in the approximation for the inductance is zero for specified frequencies, and means for producing a signal to be used for the protection of the electric power system according to the result of the determination or the discrimination.

6. A system according to claim 5, wherein the constants $K_p$ are determined by solving a set of simultaneous equations derived by substituting the specified values $\omega_q$ (q=1, 2, . . . N+1) for $\omega$ in the equation $$0 = \frac{\omega\cos\omega T/2}{\sum_{p=0}^{N} K_p\sin(p + \frac{1}{2})\omega T} - 1$$

7. A system according to claim 5, wherein N=1.

8. A system according to claim 5, wherein the difference between n and m is 1.

9. A machine implemented method for protecting an electric power system wherein signals indicative of instantaneous values of sampled electrical quantities or their synthetic values are produced, a differential equation $$v = L(di/dt) + Ri$$

is solved by using an approximate expression $$\left(\frac{di}{dt}\right) t = t_k + \left(\frac{di}{dt}\right) t = t_{k-1} \approx \sum_{p=0}^{N} K_p(i_{k+p} - i_{k-p-1})$$

to determine the inductance L and to measure or discriminate the distance from the determined inductance, where v represents the voltage, i represents the current, R represents the resistance, t represents the time, $t_k$ and $t_{k-1}$ represent time points, $i_{k+p}$ and $i_{k-p-1}$ represent values of the current i for time points represented by $t_{k+p}$ and $t_{k-p-1}$, p represents integers (0, 1, . . . N), N represents a nautral number, $K_p$ (p=0, 1, . . . N) represents constants, with at least $K_0$ and $K_1$ being values other than zero and being so determined that the errors in the approximation for the inductance is zero for specified frequencies, and a signal to be used for protection of the electric power system is produced according to the result of the measurement or the discrimination.

10. A method according to claim 9, wherein the constants $K_p$ are determined by solving a set of simultaneous equations derived by substituting the specified values $\omega_q$ (q=1, 2, . . . N+1) for $\omega$ in the equation $$0 = \frac{\omega \cos \omega T/2}{\sum_{p=0}^{N} K_p \sin(p + \frac{1}{2})\omega T} - 1$$

11. A method according to claim 9, wherein N=1.
12. A method according to claim 9, wherein the difference between n and m is 1.

* * * * *